(12) United States Patent
Engbersen et al.

(10) Patent No.: US 7,925,801 B2
(45) Date of Patent: Apr. 12, 2011

(54) METHOD AND SYSTEM FOR PROTECTION AND SECURITY OF IO DEVICES USING CREDENTIALS

(75) Inventors: Ton Engbersen, Feusisberg (CH); Zorik Machulsky, Gesher HaZiv (IL); Julian Satran, Atlit (IL); Leah Shalev, Zichron-Yaakov (IL); Ilan Shimony, Haifa (IL); Thomas Basil Smith, III, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 1487 days.

(21) Appl. No.: 11/333,716

(22) Filed: Jan. 17, 2006

(65) Prior Publication Data

US 2007/0168299 A1    Jul. 19, 2007

(51) Int. Cl.
*G06F 3/00* (2006.01)
*G06F 5/00* (2006.01)

(52) U.S. Cl. .......................................... 710/36; 713/182
(58) Field of Classification Search ............... 710/36
See application file for complete search history.

(56) References Cited

U.S. PATENT DOCUMENTS

| | | | |
|---|---|---|---|
| 5,949,882 A * | 9/1999 | Angelo ........................ | 713/185 |
| 5,987,557 A | 11/1999 | Ebrahim | |
| 6,279,111 B1 * | 8/2001 | Jensenworth et al. .......... | 726/10 |
| 6,782,438 B1 | 8/2004 | Duncan et al. | |
| 6,785,759 B1 | 8/2004 | Beukema et al. | |
| 6,795,936 B2 | 9/2004 | Harris et al. | |
| 6,832,282 B2 | 12/2004 | Duncan et al. | |
| 7,503,065 B1 * | 3/2009 | Packingham et al. ........... | 726/12 |
| 7,546,452 B2 * | 6/2009 | Aissi et al. ..................... | 713/156 |
| 7,571,472 B2 * | 8/2009 | Royer ............................ | 726/19 |
| 2004/0039924 A1 | 2/2004 | Baldwin et al. | |
| 2004/0039937 A1 | 2/2004 | Aissi et al. | |
| 2004/0088578 A1 | 5/2004 | Chao et al. | |
| 2004/0205271 A1 * | 10/2004 | O'Hare et al. ................. | 710/240 |
| 2004/0210756 A1 | 10/2004 | Mowers et al. | |
| 2004/0268152 A1 | 12/2004 | Xia et al. | |
| 2007/0143832 A1 * | 6/2007 | Perrella et al. .................... | 726/5 |

* cited by examiner

*Primary Examiner* — Henry W Tsai
*Assistant Examiner* — Elias Mamo (57) ABSTRACT

A method and system for protection and security of IO devices using credential are provided. The system may include at least one consumer arranged to initiate IO requests from the IO device, and the IO requests may include IO capability allocation and additional parameters. The system may also include an IO resource manager (IORM) arranged to translate the IO capability allocation and additional parameters included in said IO request to a set of capability tokens for the consumer or for a group of consumers, to generate a global key to protect the capability tokens, and further arranged to manage the IO device. The system may further include a channel component arranged to transfer and receive the IO request to and from the IO device.

28 Claims, 3 Drawing Sheets

METHOD AND SYSTEM FOR PROTECTION AND SECURITY OF IO DEVICES USING CREDENTIALS

CROSS REFERENCE TO RELATED APPLICATIONS

The present invention is related to U.S. patent application Ser. No. 11/333,066 (now U.S. Pat. No. 7,757,280), titled "A METHOD AND SYSTEM FOR MEMORY PROTECTION AND SECURITY USING CREDENTIALS", and filed on even date.

FIELD OF THE INVENTION

The present invention relates generally to the field of computer and processor architecture. In particular, the present invention relates to a method and system for access protection and security of IO devices using credentials.

BACKGROUND OF THE INVENTION

Figure 1:
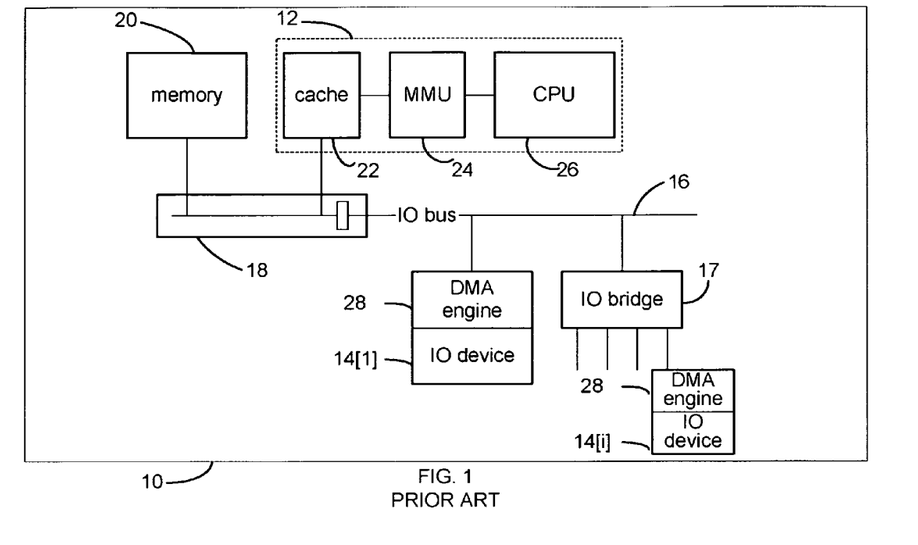
FIG. 1 is a schematic block diagram of a prior art computer system.

The architecture of most current personal computer (PC) systems, from desktop to server, may be conceptually and schematically illustrated by FIG. 1, to which reference is now made.

PC system 10 typically includes memory 20, which may be comprised within one or more processing units 12, or may be separate therefrom. Processing units 12 are typically coupled with IO devices 14[1]-14[i] via one or more IO buses 16, e.g., peripheral component interconnect (PCI) buses. Optionally, in order to make the connection between processing units 12 and IO devices 14[1]-14[i] quicker, PC system 10 may also include one or more components that communicate with the processing units 12 and control the interaction with memory 20, and the IO buses 16, e.g., a north bridge unit 18.

Typically, IO bus 16 has a flat memory and IO address space. An IO device search is done, typically at boot time, and each IO device found is mapped into the physical memory space and IO address space.

This PC architecture has several shortcomings: it does not scale well with system size, it makes it difficult to interconnect with other IO busses belonging to different PC's, and it offers very limited IO device protection, if any at all.

In theory, a Memory Management Unit (MMU) 24 which is typically coupled with CPU 26 of processing unit 12, may be used to protect the memory space of IO devices 14[1]-14[i].

However, typically the IO address space is not managed by the MMU 24 and, therefore, the IO address space is not protected. Moreover, in a system with multiple CPUs, or in a virtualized system with multiple partitions, each CPU or partition typically has complete access to the IO bus. Thus, any process with privileged permission, e.g., an operating system process, may access any IO device.

One known way of solving this problem is to pass all the requests to IO devices through a hosting partition. In this case, the devices are protected because the hosting partition is a trusted entity, and only it is permitted to access the devices. A second known way is to use multiple IO devices, each assigned to a different partition. In this case, the operating system is trusted not to access the devices that are not assigned to it. The hosting partition solution typically taxes the system resources, while the solution of assigning the IO devices to different partitions fails in the event of a rogue operating system, of innocent mis-configuration, or of buggy code.

Other attempts to protect the IO devices may be made by using IO memory management units (IOMMU) and/or access lists that typically record the IO access rights given to any process.

SUMMARY OF THE INVENTION

In accordance with some embodiments of the present invention, a method and system for protecting access and operation of IO devices are provided, the method and system using cryptographically signed capability tokens, known herein as credentials. In accordance with the present invention, IO devices may be protected by using a stateless cryptographically enforced credential mechanism.

Part of an IO device initialization process may include distributing cryptographically signed credentials to the consumer, e.g., an operating system/partition, a processing node, an application, etc., which is allowed to access the IO device. An operating system (stand-alone or in a logical partition) may attach the credential to every IO device access transaction. A Device Controller (DC) may verify the credential, and, if it is authenticated, the completion of the access transaction is allowed.

According to a first aspect of the present invention there is provided a computer-implemented system for protecting access and operation of at least one IO device.

The system may include at least one consumer arranged to initiate IO requests from the IO device, and the IO requests may include IO capability allocation and additional parameters. The system may also include an IO resource manager (IORM) arranged to translate the IO capability allocation and said additional parameters included in the IO request to a set of capability tokens for the consumer or for a group of consumers, to generate a global key to protect the set of the capability tokens, and further arranged to manage the IO device. The system may further include a channel component arranged to transfer and receive the IO request to and from the IO device.

Still in accordance with one embodiment of the present invention, the system may further include an IO subsystem manager (IOSM) arranged to generate a group credential to allow a group of consumers to access the IO device by using the group credential.

Furthermore, in accordance with this embodiment of the present invention, the channel component may further include at least one host gateway (HG) arranged to enforce the group credential by checking a cryptographically signed credential of the set of capability tokens for the consumer or for the group of consumers, a communication media arranged to transfer information through the channel component, and at least one device controller (DC) arranged to allocate the IO device to the consumer or group of consumers, and further arranged to control management rights of the IO device.

Additionally, in accordance with this embodiment of the present invention the group credential is verified by the HG and used by the group of consumers.

Optionally, according to this embodiment the IORM and the IOSM may be physically embedded in different locations.

Furthermore, in accordance with this embodiment the IOSM is further arranged to distribute the global key to the HG, provided that the HG is connected to the consumer or group of consumers coupled with the global key.

Additionally, in accordance with this embodiment the IOSM is further arranged to distribute the credential of the consumer or the group of consumers.

Still further, in accordance with this embodiment, the IORM is further arranged to generate a consumer credential to verify that the IO capability allocation of the IO request is within the permissions of the consumer.

In addition, according to this embodiment of the present invention, the consumer credential is verified by the HG and used by the consumer.

In accordance with another embodiment of the present invention the IORM is further arranged to generate a device credential to protect the IO device by controlling access and program execution rights of the IO device.

Additionally, in accordance with this embodiment, the device credential is verified by the DC and used by the consumer.

In accordance with another embodiment of the present invention the additional parameters of the IO request may include at least any one of the following: IO device access, IO permissions and IO commands.

According to a second aspect of the present invention, there is provided a computer-implemented method for protecting access and operation of at least one IO device.

The method may include translating to a set of capability tokens for a consumer or for a group of consumers an IO capability allocation of an IO request and additional parameters included in the IO request, the IO request being initiated by a consumer or a group of consumers. The method may further include generating a global key to protect the capability, and, based on the global key, issuing a cryptographically signed credential of the capability of the consumer or of a group of consumers, and controlling management rights of the IO device based on said credential.

In accordance with this embodiment of the present invention, prior to the step of controlling, the method may further include distributing the credential of the consumer or the group of consumers.

Additionally, in accordance with this embodiment of the present invention, the step of issuing may further include issuing a consumer credential to verify that the IO capability allocation of the IO request is within the permissions of the consumer.

Accordingly, in accordance with this embodiment of the present invention, the consumer credential may be verified by a host gateway (HG) and used by the consumer.

Also additionally, in accordance with this embodiment of the present invention, the step of issuing may further include issuing a group credential to allow a group of consumers to access the IO device by using the group credential.

Accordingly, in accordance with this embodiment of the present invention, the group credential is verified by the HG and used by the group of consumers.

Still additionally, in accordance with this embodiment of the present invention, the step of issuing may further include issuing a device credential to protect said IO device, and the step of controlling may further include controlling access and program execution rights of the IO device.

Accordingly, in accordance with this embodiment of the present invention, the device credential is verified by a device controller (DC) and used by the consumer.

In accordance with another embodiment of the present invention, the additional parameters included in the IO request may include at least any one of the following: IO access, IO permissions and IO commands.

According to a third aspect of the present invention there is provided a computer software product, including a computer-readable medium in which computer program instructions are stored, which instructions, when read by a computer, cause the computer to perform a method described above for protecting access and operation of at least one IO device.

BRIEF DESCRIPTION OF THE DRAWINGS

Embodiments of the present invention will now be described, by way of examples only, with reference to the accompanying drawings in which.

DESCRIPTION OF EMBODIMENTS OF THE PRESENT INVENTION OVERVIEW

It is an aim of the present invention to provide protected access and operation of IO devices. Protection of the connection between IO devices and their consumers, e.g., operating systems/partitions, processing nodes, or applications, may be provided in accordance with embodiments of the present invention. Furthermore, system isolation between operating systems or partitions, or isolation between applications or processes within the same operating system may be provided in accordance with embodiments of the present invention. Some embodiments of the present invention may also provide scalability from desktop to supercomputers, and protection of IO devices from malfunction caused by consumers may also be provided, as will be described in detail below.

To achieve the required access protection and security of IO devices, the applicants of the present invention have realized that the channel (e.g., an IO bus such as a peripheral component interconnect (PCI) bus) between the consumers that initiate the IO requests and the IO devices, as well as the channel interfaces (which will be described in detail below), are required to store minimal information to allow efficient and scalable protection of the IO devices. For example, the channel may be kept as stateless as possible. The term "stateless" is used hereinafter to mean that no state information of the data being transferred in each transaction is stored. Accordingly, minimal per-connection tables which may be coupled with the channel (or the channel interface) are required, the stored data may be stateless or self-described, and the protection to the IO devices may be achieved through cryptographically signed capabilities.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
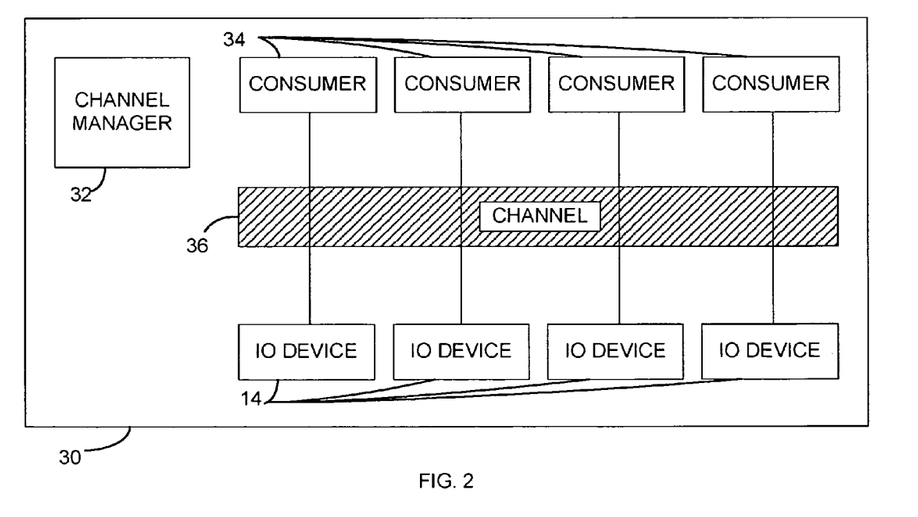
FIG. 2 is a simplified block diagram of a logical view of a system in accordance with embodiments of the present invention.

Reference is now made to FIG. 2, which is a simplified block diagram of a logical view of a system 30 in accordance with embodiments of the present invention. During an interaction between any consumer 34 and any IO device 14, the respective IO device 14, whether it has a node which controls it (not shown) or whether it is a specific IO device, may operate on a connection to a single consumer, as shown by the straight line from IO devices 14 to consumers 34. Such an interaction may include, for example, initiation of an IO request that may include, e.g., IO capability allocation, IO device access, IO permissions, IO commands, etc. (hereinafter referred as "IO request"). The interaction may further include execution of the IO request by the IO device, and sending feedback to the consumer based on the specific IO request.

A secured IO access is required to protect the connection of the consumer to the IO device. The term "protection" is used hereinafter, and it includes the authentication (both from the CPU and the IO side) of the connection; bidirectional access control, e.g., what access rights are allowed by the IO device to the consumer, and in the other direction, what access rights are allowed by the consumer to the IO device; data integrity protection, e.g., verifying that the transferred data has not been modified by the channel, deliberately or not; and protection against a variety of attacks.

Protection of the data while it is being sent over the channel may be provided by having a physically secured connection, such as a dedicated IO bus, e.g., a peripheral component interconnect (PCI) bus, or by using a network security protocol, e.g., IPsec.

In accordance with an embodiment of the present invention, the channel manager 32 may control and manage the protection of the IO devices. The channel manager 32 may assign credentials to the requested capabilities, e.g., allowed memory regions, access rights, etc., while the channel interface units (not shown) may verify that each access to the IO device is within the capability granted by channel manager 32.

In accordance with this embodiment, each IO device may communicate and have direct memory access (DMA) of data only to/from its intended consumer. Therefore, any attacks or errors may affect only the consumer that launched the IO connection, and isolation between the different consumers may be achieved as part of the protection of the IO device. Such isolation may also prevent a single consumer or IO device from taking over the channel, thus starving other consumers or IO devices.

System Description

Figure 3:
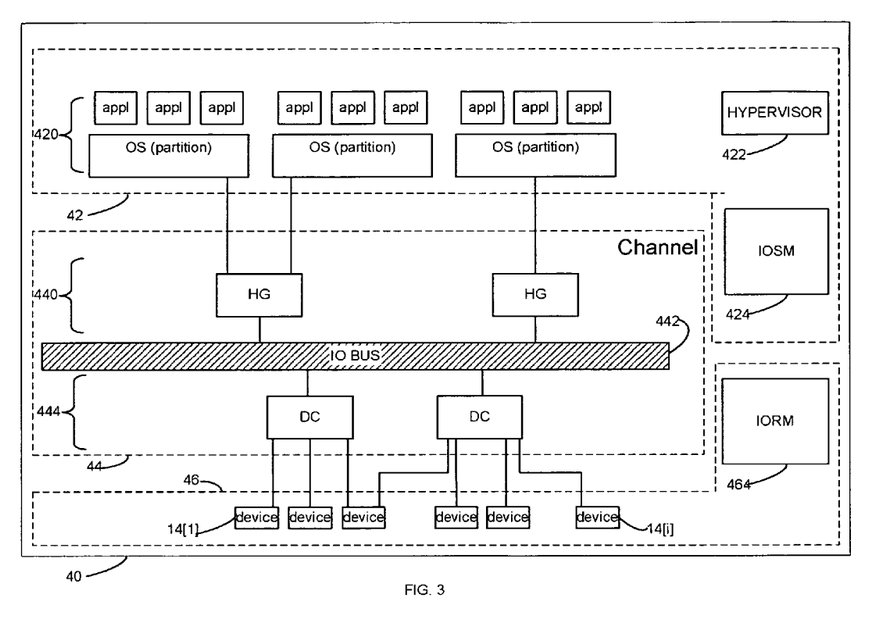
FIG. 3 is a schematic block diagram of a credential based computer system in accordance with an embodiment of the present invention.

Reference is now made to FIG. 3 which is a schematic block diagram of a credential based computer system 40 in accordance with an embodiment of the present invention. System 40 may utilize credentials to protect access to IO devices 14[1]-14[i] and to protect their operation, as will be described in detail below.

System 40 may include three (3) sections that will be described in detail below. Section 42 may include CPUs (not shown), consumers 420, and a hypervisor 422 that may manage the upper layers of system 40, e.g., the operating systems of system 40, the consumer applications etc. It should be noted that in a virtualized system each OS may reside in a separate partition, whereas a non-virtualized system may have no partitions. Section 42 may further include an IO Subsystem Manager (IOSM) 424 that may translate the allocated memory spaces of the consumer applications to the capabilities of the consumers and generate global diversity keys ($K_{DIV}$) as will be described below. Logically considered, IOSM 424 may be part of channel manger 32 described above. Furthermore, IOSM 424 may generate group credentials to define several consumers as part of one group as will be described in detail below.

Channel section 44 may include host gateways (HG) 440. In accordance with this embodiment of the present invention, HGs 440 may be trusted by hypervisor 422 to enforce the memory usage of the consumer by using the credential of the consumer. HGs 440 are highly reliable and trusted, since they may be able to access all of the memory allocated to channel section 44.

The channel section may further include the channel media 442, which may potentially be a communication network, and/or IO buses such as PCI buses. The network is typically an Internet Protocol (IP) network. Depending on the specific application, it may comprise a wide-area network (WAN), such as the Internet, a local-area-network (LAN), or any other suitable network connection. Device controllers (DC) 444 may be coupled with the channel and connected to IO devices 14[1]-14[i]. DCs 444 may enforce the IO devices allocation to consumers, and they may control the management rights, e.g., start transaction, abort, etc., of IO devices 14[1]-14[i].

The HGs 440 may receive the diversity keys ($K_{DIV}$) generated by the IOSM 424. $K_{DIV}$ may then be used for communication with DCs 444. HG 440 may also create and verify the memory region credentials as described in U.S. patent application Ser. No. 11/333,066 (now U.S. Pat. No. 7,757,280), titled "A METHOD AND SYSTEM FOR MEMORY PROTECTION AND SECURITY USING CREDENTIALS", filed on even date, and assigned to the common assignee of the present invention.

Section 46 may include IO devices 14[1]-14[i], the interface with DC's 444, and at least one IO Resource Manager (IORM) 464, which may manage the IO devices coupled with it. Logically considered, IORM 464 may be part of channel manger 32 described above. Furthermore, although IORM 464 is described as part of section 46, in an optional design of system 40, IOSM 424 and IORM 464 may be embedded together in the same component and referred to together as IO manager (IOM), not shown. In the design shown in FIG. 3, IOSM 424 and IORM 464 are illustrated separately for clarification purposes only.

IOSM 424 may distribute credentials of consumers or of groups of consumers for each HG 440 of its respective trust zone, and it may distribute the diversity keys ($K_{DIV}$) for the HGs 440. IORM 464 may manage the IO devices 14[1]-14[i] and the DCs 440, e.g., allocating the IO devices resources to the consumers 420, distributing keys to the DCs 440, etc.

In accordance with this embodiment, each section may be protected by the components connected to it. For example, HGs 440 may protect the consumers 420 as described in U.S. patent application Ser. No. 11/333,066 (now U.S. Pat. No. 7,757,280), titled "A METHOD AND SYSTEM FOR MEMORY PROTECTION AND SECURITY USING CREDENTIALS", filed on even date, and assigned to the common assignee of the present invention. Accordingly, HG 440 may protect the memory space of the consumers from adverse usage of 10 direct memory access (DMA) by using credentials, e.g., time based credentials. HG 440 may also protect the 10 memory space of system 40 from erroneous partition access.

DCs 444 may protect IO devices 14[1]-14[i] and the program execution unit of each IO device, e.g., the driver that controls the IO device. The protection of the IO device may include controlling which consumer may access the IO device, and controlling the specific usages of the device. This kind of protection may be achieved by using the device credentials as will be described in detail below. For example, in case the IO device is a disk, DC 444 may hold a list of the blocks in the disk with allowed access to a specific consumer. In another example, DC 444 may control what is the allowed memory region in a memory mapped device.

Credentials Used to Protect the IO Devices

As previously mentioned, protection of IO devices in accordance with embodiments of the present invention is achieved by using capability descriptions, signed cryptographically, called "credentials". Several credentials may be generated to provide the protection of the IO devices.

One type of credential may be referred to as a "consumer credential". The consumer credential may provide protection between consumers by verifying that memory requests of an application are within the memory bounds of the consumer. The consumer credential may be defined by hypervisor 422, generated by IOSM 424, verified by HG 440, and used by consumers 420. An exemplary cryptographic algorithm that may be used to generate the consumer credential is similar to the one used in Object Store, defined by the Storage Networking Industry Association (SNIA) in "Object Store Security Document T10/03-279r0", www.t10.org/ftp/t10/document.03/03-279r0.pdf.

A second type of credential, referred to hereinafter as a "group credential" may be generated to define several consumers as part of one group. A group credential may allow efficient IO device sharing by delegating the credential of the IO device between the consumers that are members of the group. A group credential may be generated by IOSM 424 and verified by HG 440. Consumers that are members of the same group may share the device capability ($CAP_D$). $CAP_D$ may include a reference to the group id ($G_{ID}$). Each consumer may receive a group capability $CAP_G$. Accordingly, HG 440 or DC 444 may check the group capability $CAP_G$ before any further program processing.

The third type of credential is referred to hereinafter as a "device credential". A device credential may protect the specific information, e.g., disk block list, of an IO device, in addition to controlling the access rights of the device and the program execution rights of the device. It may be defined and generated by IORM 464, verified by DC 444, and used by consumers 420. An exemplary cryptographic algorithm that may be used to generate the credential is the same one that was mentioned above.

Another type of credential is a memory window credential, which is described in U.S. patent application Ser. No. 11/333,066 (now U.S. Pat. No. 7,757,280), titled "A METHOD AND SYSTEM FOR MEMORY PROTECTION AND SECURITY USING CREDENTIALS", filed on even date, and assigned to the common assignee of the present invention. A memory window credential may check that the usage of memory allocated to an 10 device for a specific consumer, e.g., an application, is within the memory of the partition of that consumer and therefore the consumer is allowed to use this 10 device. Using a time stamp credential may allow efficient renewal of the memory window credential.

Data Transaction

In accordance with some embodiments of the present invention several secured keys may be generated and distributed to support the protection of the IO devices. In conjunction with FIG. 3, reference is now made to FIG. 4A which is an exemplary flow chart diagram of a method of a secured data transaction in accordance with an embodiment of the present invention. This secured transaction may be utilized for the protection of the IO devices.

Figure 4A:
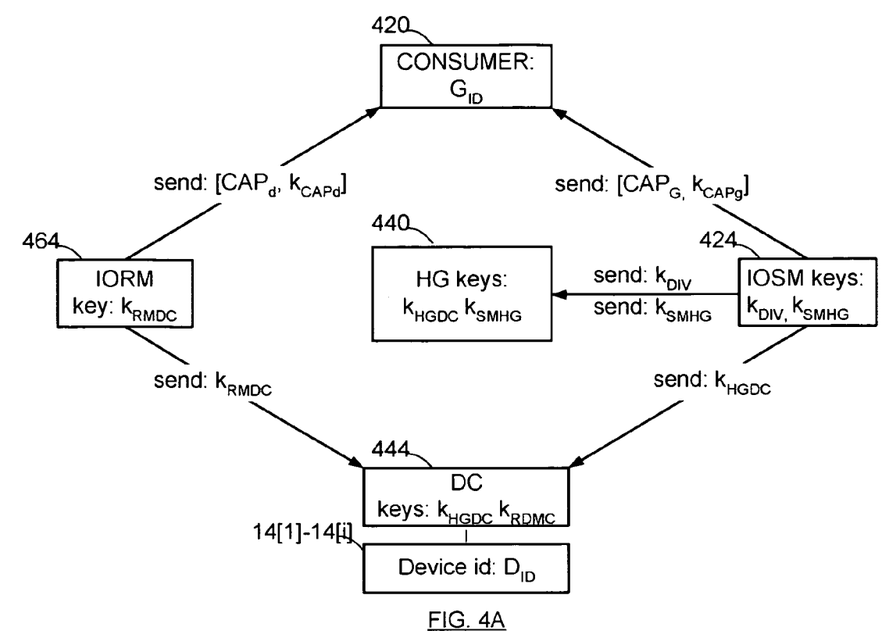
FIG. 4A is an exemplary flow chart diagram of a method of a secured transaction in accordance with an embodiment of the present of invention.

A key $K_{HGDC}$ may be used between HG 440 and DC 444. Since each HG 440 may be connected to many DC's 444, $K_{HGDC}$ may be derived from a global diversity key ($K_{DIV}$). As mentioned previously IOSM 424 may generate $K_{DIV}$ and send it to the respective HG 440. Optionally, a different $K_{HGDC}$ may be generated for each HG 440-DC 444 pair. $K_{HGDC}$ may be generated, for example, by implementing a hashing algorithm on $K_{DIV}$ and the id of the IO device ($D_{ID}$):

$K_{HGDC}$=hash $K_{DIV}\{D_{ID}\}$

A pair of additional keys, $K_{SMHG}$ and $K_{RMDC}$, may be used for the device capability ($CAP_D$).

$CAP_D$ may include the IO device ID ($D_{ID}$), the group ID ($G_{ID}$), and the access rights and specific device associated with this capability:

$CAP_D$=[$D_{ID}$, $G_{ID}$, access rights, specific device]

The $K_{SMHG}$ and $K_{RMDC}$ keys may be generated by the IOSM 424 and IORM 464, respectively, and sent to the consumer 420 using them and to HG 440 and DC 444 for verification purposes.

$CAP_D$ may be used to authenticate the device memory usage, using, for example, a double hashing scheme. IORM 464 may use $K_{RMDC}$ to create a new key, $K_{CAPd}$:

$K_{CAPd}$=hash $K_{RMDC}\{CAP_D\}$

A group capability, $CAP_G$, that may allow a group of consumers to access the IO device may be generated:

$CAP_G$=[$G_{ID}$,$P_{ID}$]

$CAP_G$ may be used to authenticate the group memory usage, using, for example, a double hashing scheme. IOSM 424 may use $K_{SMHG}$ to create a new key, $K_{CAPg}$:

$k_{CAPg}$=hash $K_{SMHG}\{CAP_G\}$

Since $CAP_G$ may contain the group id ($G_{ID}$), it may be used by any member of a group with the same $G_{ID}$. $CAP_G$ may also contain the partition ID.

As shown in FIG. 4A, the connection between IOSM 424 and DC 444, and between IORM 464 and the consumer 420 may only be needed for key distribution. This secure channel may be opened directly, through a connection between IOSM 424 and IORM 464 (not shown), or piggybacked through DC 444 and HG 440.

Figure 4B:
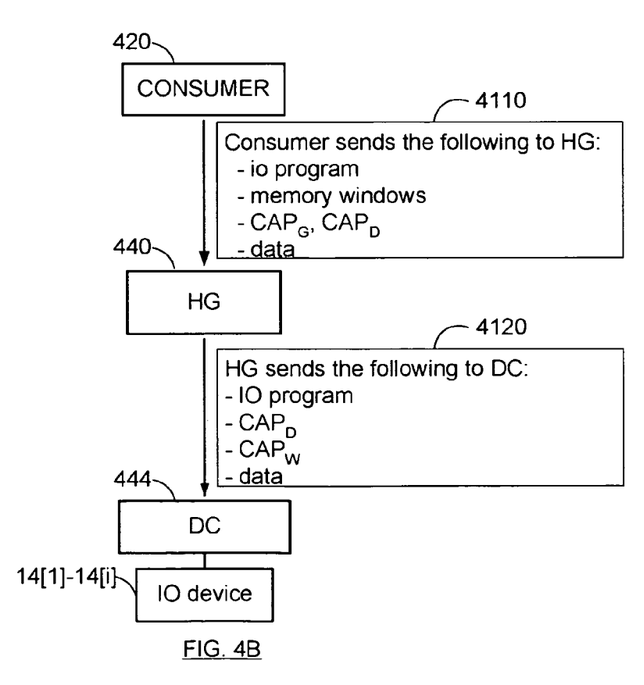
FIG. 4B is an exemplary flow chart diagram of a method of authenticating the transaction between the IO devices and the consumers when the IO devices are initiated, in accordance with an embodiment of the present invention.

Reference is now made to FIG. 4B, which is an exemplary flow chart diagram of a method of authenticating the transaction between the IO devices and the consumers when the IO devices are initiated, in accordance with an embodiment of the present invention. FIG. 4B should be reviewed in conjunction with FIGS. 3 and 4A. To protect the IO devices when the IO programs that control the IO devices are initiated, authentication of the allowed memory usage of the program may be required, the capabilities described above for the memory may be created, and the authentication of the IO device may be utilized.

To ensure the memory authentication and usage of a certain IO device, consumer 420 is required to have a valid $CAP_G$ for the IO device (indicating that the consumer is part of the group allowed to use this device), and a valid $CAP_D$ to authenticate the device memory usage. As shown in FIG. 4A, IOSM 424 may generate $CAP_G$, and IORM may generate $CAP_D$. HG 440 may receive (step 4110) these capabilities as well as a description of the memory regions to be used and the access rights to the IO device, e.g., the address, the size of the region, a read/write access right, etc. Thereafter, the memory window credentials ($CAP_W$ and $CAP_T$) briefly mentioned above may be generated. $CAP_W$ may then be sent (step 4120) with the IO program, $CAP_D$, and the data information to the addressed DC 444.

It should be noted that HG 440 is not required to verify $CAP_D$. It may be required only to check that the $G_{ID}$ field in $CAP_D$ is described by $CAP_G$. DC 444 may verify that $CAP_D$ has not been forged. In addition, DC 444 may verify $CAP_D$, and it may receive and store $CAP_W$ and $CAP_T$ as part of the IO program data structure.

Table I below provides a summary of the secured keys generation and distribution:

TABLE I

| Credential Type | DC | IORM | IOSM | Consumer | HG |
|---|---|---|---|---|---|
| Group | | | ← $k_{SMHG}$ → $k_{CAPg}$ → $k_{CAPg}$ | | → $k_{SMHG}$ $k_{CAPg}$ ← |
| Memory Window | $k_{HGDC}$ ← | | $k_{DIV}$ = $k_{HGDC}$ ← | | → $k_{DIV}$ $k_{HGDC}$ ← |
| Device | ← $k_{RMDC}$ ← $k_{CAPd}$ | → $k_{RMDC}$ | | | → $k_{CAPd}$ |

Keys in Table I that are marked in bold text are keys that are generated and stored in the various components, whereas keys that are marked in normal text may be derived from the stored keys and may be distributed to the various components.

Table II below provides a summary of the usage made by the secured keys:

TABLE II

| CONSUMER | HG | DC | IOSM | IORM |
|---|---|---|---|---|
| $K_{CAPG}$ → | ← $K_{SMHG}$ — — | | | |
| | $K_{CAPD}$ ·····→ | ←·· | $K_{RMDC}$ ············ | |
| | | $K_{HGDC}$ ← — — | | |
| | · $\overline{K_{DIV}}$ → | | · $\overline{K_{DIV}}$ → | |

As shown in Table II, the dashed arrows show the usage done by the group credential ($K_{CAPg}$ and $K_{SMHG}$). The dotted arrows show the usage done by the IO device credential ($K_{CAPd}$ and $K_{RMDC}$). The dotted and dashed arrows show data flow ($K_{DIV}$ and $K_{HGDC}$).

In the description above, numerous specific details were set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code that embodies aspects of the present invention is typically maintained in permanent storage, such as a computer readable medium. In a client-server environment, such software programming code may be stored on a client or server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software. For example, HG 440x may be embodied in computer software, or alternatively, in part or in whole using hardware components.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for protecting access and operation of input/output (IO) devices, comprising the steps of:
   issuing from an IO subsystem manager of a computer system a group credential to members of a group of consumers comprising a plurality of consumers that authorizes the consumers to share usage of an IO device, the group credential comprising a first identifier of the group;
   issuing from an IO resource manager a device credential to members of a group of consumers comprising a second identifier of the group and specifying the IO device and specifying privileges for use of the IO device;
   conveying a request to use the IO device from one of the consumers to a host gateway in a channel, the request comprising an IO command, the group credential and the device credential;
   authenticating the one consumer as a member of the group at the host gateway using the group credential;
   transmitting the request to a device controller of the IO device specified in the device credential;
   making a determination in the device controller that the request conforms to the privileges of the device credential; and
   responsively to the determination granting the request.

2. The method according to claim 1, further comprising the step of at the host gateway making a comparison between the first identifier and the second identifier, wherein transmitting the request is performed responsively to the comparison.

3. The method according to claim 1, further comprising signing the request in the host gateway using a secured key.

4. The method according to claim 3, further comprising the step of validating the request in the device controller using the secured key.

5. The method according to claim 1, wherein the group credential is a cryptographically signed token that specifies one or more consumers that may share access to one or more IO devices, wherein the host gateway is operative to validate the group credential of the one consumer by verifying the first identifier of the one consumer.

6. The method according to claim 1, wherein the privileges of the device credential comprise device access rights.

7. The method according to claim 6, wherein transmitting the request comprises transmitting a memory access credential specifying memory access rights.

8. The method according to claim 1, wherein the privileges of the device credential comprise IO permissions.

9. The method according to claim 1, wherein the privileges of the device credential comprise IO program execution rights.

10. The method according to claim 1, wherein associating the device credential with the request comprises transmitting the device credential and the request from the host gateway to the device controller and wherein making the determination that the request conforms to the privileges of the device credential is performed by the device controller.

11. A computer software product for protecting access and operation of input/output (IO) devices, including a computer-readable non-transitory storage medium in which computer program instructions are stored, which instructions, when executed by a computer, cause the computer to perform the steps of:
   issuing from an IO subsystem manager of a computer system a group credential to members of a group of consumers comprising a plurality of consumers that authorizes the consumers to share usage of an IO device, the group credential comprising a first identifier of the group;
   issuing from an IO resource manager a device credential to members of a group of consumers comprising a second identifier of the group and specifying the IO device and specifying privileges for use of the IO device;
   conveying a request to use the IO device from one of the consumers to a host gateway in a channel, the request comprising an IO command, the group credential and the device credential;
   authenticating the one consumer as a member of the group at the host gateway using the group credential;
   transmitting the request to a device controller of the IO device specified in the device credential;
   making a determination in the device controller that the request conforms to the privileges of the device credential; and responsively to the determination granting the request.

12. The computer software product according to claim 11, wherein the instructions cause the computer to perform the additional step of at the host gateway making a comparison between the first identifier and the second identifier, wherein transmitting the request is performed responsively to the comparison.

13. The computer software product according to claim 11, wherein the instructions cause the computer to perform the additional step of signing the request in the host gateway using a secured key.

14. The computer software product according to claim 13, wherein the instructions cause the computer to perform the additional step of validating the request in the device controller using the secured key.

15. The computer software product according to claim 11, wherein the group credential is a cryptographically signed token that specifies one or more consumers that may share access to one or more IO devices, wherein the instructions cause the computer to perform the additional step of causing the host gateway to validate the group credential of the one consumer by verifying the first identifier of the one consumer.

16. The computer software product according to claim 11, wherein the privileges of the device credential comprise device access rights.

17. The computer software product according to claim 16, wherein transmitting the request comprises transmitting a memory access credential specifying memory access rights.

18. The computer software product according to claim 11, wherein the privileges of the device credential comprise IO permissions.

19. The computer software product according to claim 11, wherein the privileges of the device credential comprise IO program execution rights.

20. A data processing system adapted to protecting access and operation of input/output (IO) devices comprising:
   a processor;
   a plurality of consumers, defining a group of consumers, and comprising at least one operating system and a set of applications executing under control of the at least one operating system;
   at least one IO device;
   a channel manager for managing protection of the at least one IO device, comprising a host gateway and a device controller for the at least one IO device;
   an IO subsystem manager;
   an IO resource manager;
   a memory accessible to the processor storing programs and data objects therein, wherein execution of the programs cause the system to perform the steps of:
   issuing from the IO subsystem manager of a computer system a group credential to members of the group of consumers that authorizes the consumers to share usage of the IO device, the group credential comprising a first identifier of the group;
   issuing from the IO resource manager a device credential to members of a group of consumers comprising a second identifier of the group and specifying the IO device and specifying privileges for use of the IO device;
   conveying a request to use the IO device from one of the consumers to the host gateway, the request comprising an IO command, the group credential and the device credential;
   authenticating the one consumer as a member of the group at the host gateway using the group credential;
   transmitting the request to the device controller of the IO device specified in the device credential;
   making a determination in the device controller that the request conforms to the privileges of the device credential; and
   responsively to the determination granting the request.

21. The data processing system according to claim 20, wherein the host gateway is operative for making a comparison between the first identifier and the second identifier, wherein transmitting the request is performed responsively to the comparison.

22. The data processing system according to claim 20, wherein the host gateway is operative for signing the request in the host gateway using a secured key.

23. The data processing system according to claim 22, wherein the device controller is operative for validating the request in using the secured key.

24. The data processing system according to claim 20, wherein the group credential is a cryptographically signed token that specifies one or more consumers that may share access to one or more IO devices, wherein the host gateway is operative to validate the group credential of the one consumer by verifying the first identifier of the one consumer.

25. The data processing system according to claim 20, wherein the privileges of the device credential comprise device access rights.

26. The data processing system according to claim 20, wherein the privileges of the device credential comprise IO permissions.

27. The data processing system according to claim 20, wherein the privileges of the device credential comprise IO program execution rights.

28. The data processing system according to claim 20, wherein associating the device credential with the request comprises transmitting the device credential and the request from the host gateway to the device controller and wherein making the determination that the request conforms to the privileges of the device credential is performed by the device controller.

* * * * *